United States Patent

Reh et al.

[11] 4,217,028
[45] Aug. 12, 1980

[54] FIBER OPTIC ELECTROMECHANICAL SUBMARINE CABLE TERMINATION

[75] Inventors: Oswald R. Reh, Bonita; Hans E. Heinzer, Chula Vista, both of Calif.

[73] Assignee: International Telephone and Telegraph Corporation, New York, N.Y.

[21] Appl. No.: 927,667

[22] Filed: Jul. 24, 1978

[51] Int. Cl.² .............................................. G02B 5/14
[52] U.S. Cl. .............................. 350/96.20; 174/70 S; 350/96.23
[58] Field of Search ............... 350/96.20, 96.21, 96.22, 350/96.23; 174/70 R, 70 S

[56] References Cited

U.S. PATENT DOCUMENTS

| | | | |
|---|---|---|---|
| 2,155,650 | 4/1939 | Gilbert | 174/70 S |
| 2,697,739 | 12/1954 | Presswell | 174/70 S |
| 3,883,218 | 5/1975 | Slaughter | 350/96.23 |
| 3,910,678 | 10/1975 | McCartney et al. | 350/96.21 |
| 3,946,467 | 3/1976 | Lukas et al. | 350/96.20 X |
| 3,982,815 | 9/1976 | Nakayama | 350/96.22 |
| 4,110,000 | 8/1978 | Bogar et al. | 350/96.21 |

Primary Examiner—John K. Corbin
Assistant Examiner—John D. Lee
Attorney, Agent, or Firm—William T. O'Neil

[57] ABSTRACT

Termination device for anchoring a fiber optic cable, especially in a fiber optic cable submarine signaling system wherein the cable must be periodically interrupted and anchored to the housing of a repeater, or the like. A central cable or strength member of steel, for example, is built into the cable along with a plurality of optical fibers. A compression block accepts the cable through an axial bore which flares out into a conical shape. A pressure cone has an axially slotted wall to form a plurality of tines which tend to compress radially inward against the strength member of the cable actually inserted therein when the cone is axially compressed into the conical cavity of the pressure block. Individual optical fiber passages through the compression block flare out from the small end of the conical cavity and pressure cone. The compression block fits into a cup of insulating material, the cable entering through a bore in the closed end of the cup. The insulating cup electrically isolates the compression block and pressure cone assembly which would normally be of a conductive metallic material from the housing of the repeater assembly, etc., into which the entire assembly is mechanically fitted. The pressure cone is held within the compression block by a circle of bolts and a torsion resisting bolt holds the compression block in the congruent cavity of the cup.

7 Claims, 8 Drawing Figures

FIBER OPTIC ELECTROMECHANICAL SUBMARINE CABLE TERMINATION

BACKGROUND OF THE INVENTION

1. Field of the Invention

The invention relates to apparatus for anchoring or terminating cables mechanically and electrically, and especially to submarine optic cable systems.

2. Description of the Prior Art

Submarine cables in electric signaling systems are well-known and have been used for many years. Therein the requirement for anchoring submarine cables of the electric type has long existed, i.e., where these cables are to be interrupted and coupled into and out of submarine housings enclosing repeater amplifier equalizers or the like.

The field of fiber optic signaling is so comparatively recent in its development, especially in respect to submarine cables of the fiber optic type, that truly analogous prior art has not yet developed. Obviously terminations for anchoring the electric cables aforementioned exist, but the requirements therefor are considerably different than for fiber optic cables.

The manner in which the present invention addresses the problem of anchoring or terminating a fiber optic cable having a built-in steel cable or the like as a strength member will be evident as this description proceeds.

SUMMARY

A typical cable for a submarine fiber optic signaling system is relatively small in size, since the signal carrying optical fibers themselves are small. A fiber optic cable for such purposes can be selected from commercially available cables, and might typically include a copper-plated steel cable as a strength member essentially at the core of the cable. Such a cable might typically be one millimeter in diameter, surrounded by a polyethylene coating on the order of 3 millimeters thickness outside of which three 120° circumferentially spaced optical fibers of approximately 6 millimeters diameter each are placed and run generally parallel to the steel cable strength member. Overall outside this configuration is an outer polyethylene jacket also on the order of 3 millimeters thickness.

The cable passes through an axial bore in an insulating cylindrical cup and, with the polyethylene coatings removed the strength member and optical fibers then pass into a compression block and pressure cone assembly. The strength member is held by the compressed tines of a pressure cone member as it passes axially through a bore in the pressure cone. The radially inwardly directed compression of these tines is effected by inclined plane action produced as the pressure cone is axially forced into a conical cavity in the compression block. The optical fibers are each conducted independently through a corresponding relatively free-fitting passage in the compression block running roughly parallel to the conical cavity.

Since, in optical fiber signaling systems of the type to which the invention most directly applies some electrical power is required for the operation of repeater amplifiers and the like, the strength member of the cable doubles as an electrical conductor, the insulating cylindrical cup serving to electrically isolate the compression block and pressure cone subassembly from the repeater housing and other apparatus into which the insulating cup may be fixed.

The details of a typical embodiment for the practice of the invention will be evident as this description proceeds.

BRIEF DESCRIPTION OF THE DRAWINGS

FIG. 3b is a full end view of the compression block part represented in sectioned view 3a.

FIG. 4b is a full end view of the pressure cone part represented in FIG. 4a.

DETAILED DESCRIPTION

The compact, lightweight, highly-reliable termination device according to the invention is capable of withstanding comparatively high tensile forces as encountered during cable assembly handling and deployment. In addition, the termination device according to the invention provides full protection and insulation of the electric power carrying, copper-clad strength member of the optical fiber cable and safe tension-free bypasses in the termination device for the optical fiber transmission elements.

Figure 1:
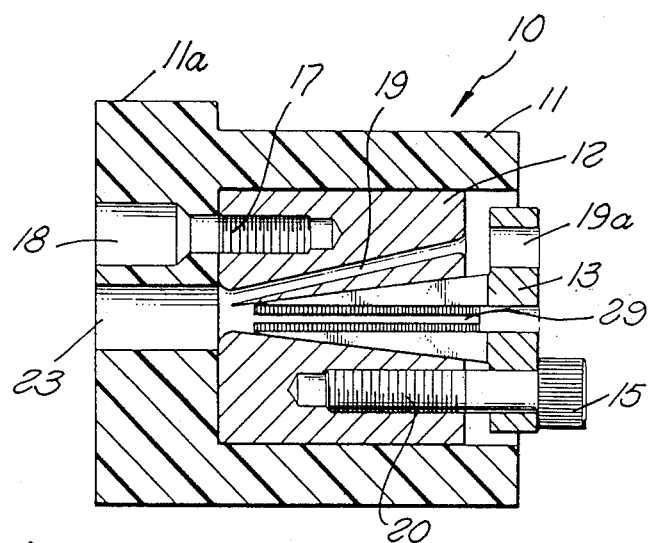
FIG. 1 is an axially-sectioned view of the compression block and pressure cone assembled into the cylindrical insulating cup, but without the cable inserted therein.
Figure 5:
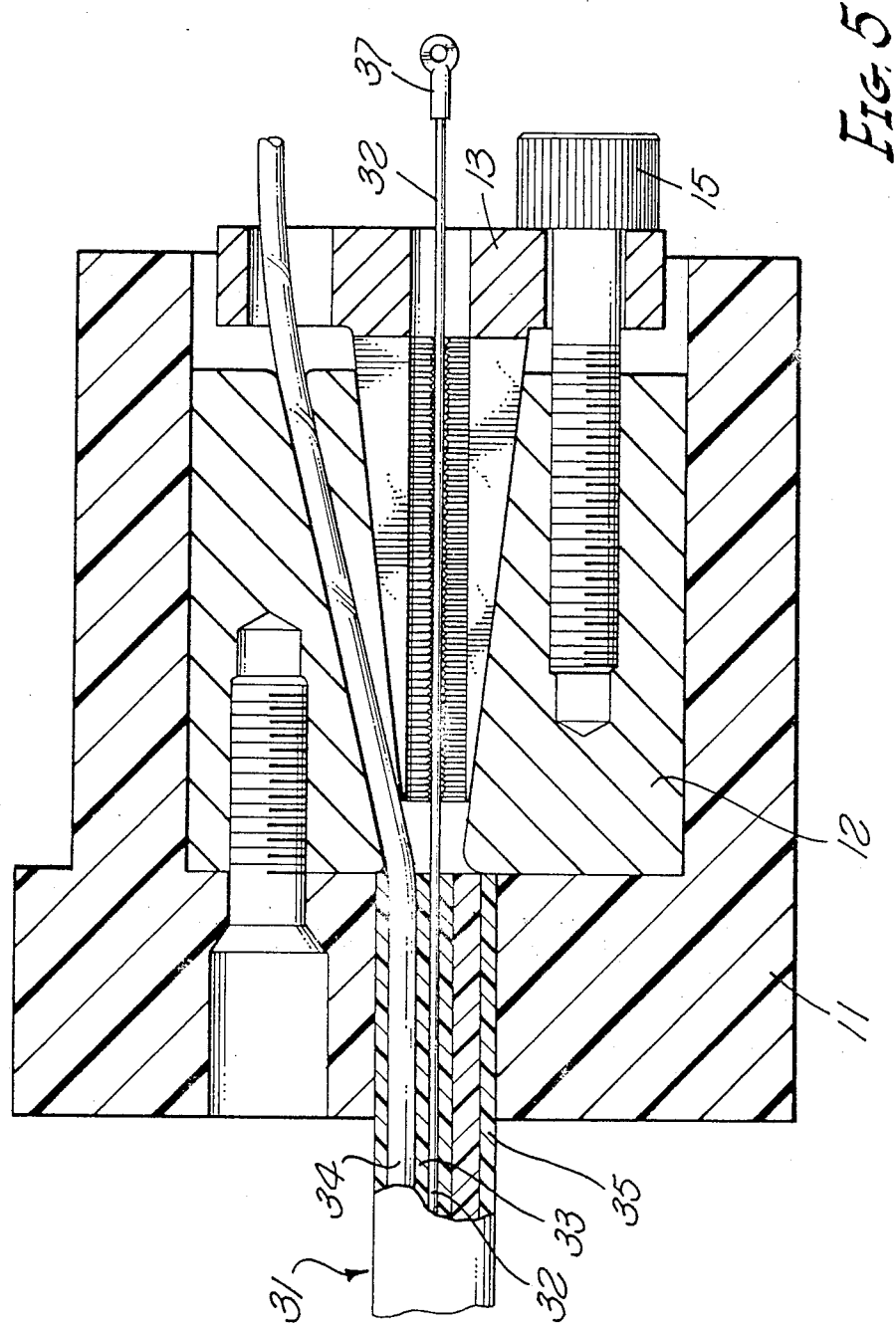
FIG. 5 is an axially sectioned assembly according to FIG. 1 with a typical fiber optic cable installed therein.

FIGS. 1 and 5 are essentially the same except that FIG. 5 shows the assembly with cable installed. These two figures will be described together but first FIGS. 2a and b, 3a and b and 4a and b will be discussed in order that the individual parts of the assembly can be better understood before they are discussed assembled together.

Figure 2A:
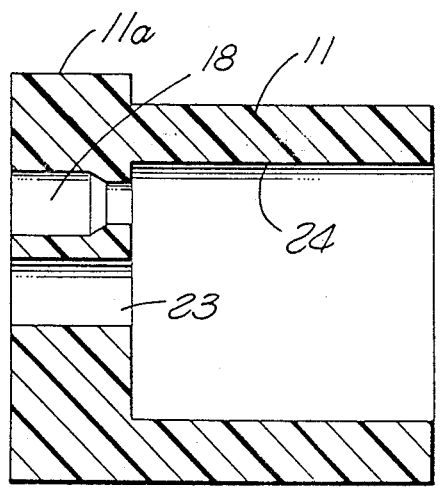
FIG. 2a is a detail of the insulating cylindrical cup of FIG. 1, similarly sectioned axially.
Figure 2B:
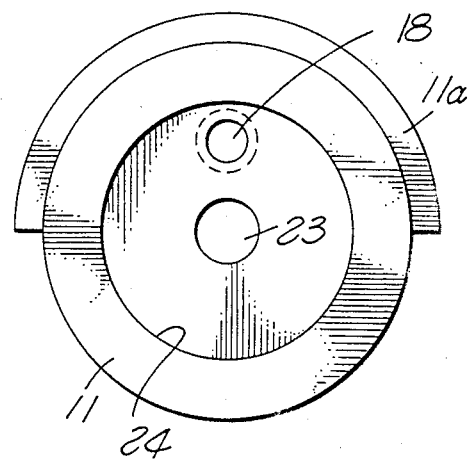
FIG. 2b is a full end view of the part represented in the FIG. 2a sectioned view.

Referring now to FIGS. 2a and 2b. A cylindrical cup 11 of insulating material such as teflon, nylon or fiberglass is shown in axially sectioned from 2(a) and as a full end view in FIG. 2(b). This part has a bore 23 from the left end as viewed in FIG. 2(a) for accepting the fiber optic cable in a manner which will be more clearly presented in FIG. 5 subsequently. A counterbore 24 produces a cavity into which the metallic parts are assembled. A bolt cavity 18 and a semi-annular integral ring 11a provide attachment means, the bolt in 18 serving to secure part 12, the compression block of FIG. 3(a), in place and prevent torsional forces from rotating parts 11 and 12 with respect to each other. The semi-annular ring 11a provides an anti-rotational device operative between the cup 11 and a housing into which it may be mounted, for example, the housing of a submarine repeater, the part 11 can fit into a cavity or opening having a corresponding shape, the flange 11a thereby preventing rotation of the cup 11 with respect to any such housing in which it may be mounted. That housing itself is not illustrated, since it is not a part of the present invention, it being understood that it may be of a type extant in the prior art respecting submarine electric signaling systems.

Figure 3A:
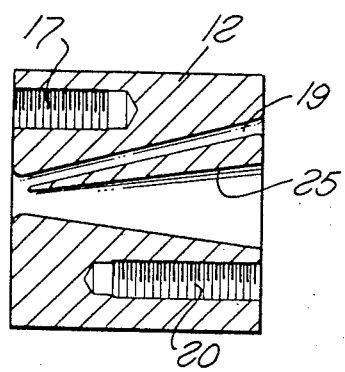
FIG. 3a is an axially-sectioned view of the compression block according to FIG. 1.

In FIG. 3(a) a compression block part 12 is illustrated in axially-sectioned form; and in FIG. (b) the same part is illustrated in a full end view. Considering FIGS. 3(a) and (b) together it will be seen that there is a conical bore or cavity 25, and three optical fiber passages 19, 21 and 22 are also provided. The three optical fiber passages aforementioned correspond to the three optical fibers assumed in the typical fiber optical cable corresponding to the example illustration. Of course it will be realized that fewer or more than three optical fibers might be involved in such an arrangement and accordingly it will be obvious to those skilled in this art that fewer or more optical fiber passages such as 19, 21 and 22 can be provided, these being understood to be clearance passages through which the optical fibers are discretely inserted in a slip-fit relationship. Threaded bores receiving the anti-torsion bolt through 18 and for mounting the pressure cone of 4(a) and (b) are illustrated at 17 and at 16, 20 and 36 respectively.

Figure 4A:
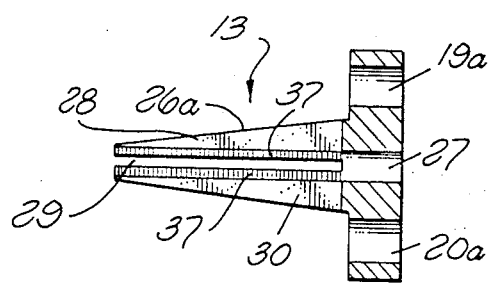
FIG. 4a is a similarly axially sectioned view of the pressure cone of FIG. 1 in independent detail.
Figure 4B:
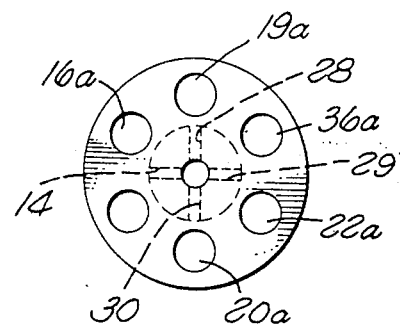

Referring now to FIGS. 4(a) and (b), a detail of the pressure cone is presented. FIG. 4(a) is the axially sectioned view corresponding to the FIGS. 2(a) and 3(a) and FIG. 4(b) is the full end view of the part represented in FIG. 4(a). This pressure cone 13 has a conical portion 26a and four axial cuts through the wall formed between the conical perimeter surface 26a and the internal bore 27. These are most clearly seen in FIG. 4(b) at 14, 28, 29 and 30. The openings through the flange portion of pressure cone 26 identified at 19a, 21a, and 22a are spaced 120° as indicated and in between are bolt holes 16a, 20a and 36a. Those at 19a, 21a and 22a correspond to fiber optic passages 19, 21 and 22 in part 12. The optical fibers passing therethrough also pass loosely through the aforementioned pressure cone flange openings.

Bolt holes 16a, 20a and 36a receive bolts which engage the threaded bores 16, 20 and 36 respectively in the compression block 12.

At this point it will be realized that the axial compression exerted by these bolts free-fitting through 16a, 20a and 36a forces the pressure cone surface 26a into a tight fit within the conical bore or chamber 25 in block 12. In fact, it will be evident that the proper relative shapes of the conical surfaces 25 and 26a will provide for exertion of a radially inward force over the circumference of part 13 by inclined plane action, this radial pressure tending to close the axial grooves or cuts 14, 28,29 and 30 so that the tines formed in the pressure cone wall by those slots or cuts tend to be deflected radially inward in response. Referring now to FIGS. 1 and 5 taken together, the relationship of the block 12 and the presure cone 13 which produces this inward deflection of the aforementioned tines of part 13 will cause those tines to strongly grip the fiber optic cable strength member 32, tensile loads applied to that cable tending to act to increase the seating pressure of the pressure cone 13 within the compression block 12 corresponding to a further increase of the radially inward tine-gripping force resulting. In FIG. 4a, it will be noted that there is internal ridging 37 within the bore 27. These may be simple internal threads and may be of only partial thread depth. During manufacture, these threads or ridges are most easily produced by an internal threading operation before the axial slots 14, 28, 29 and 30 are cut. The purpose of these ridges or threads which are generally circumferential within bore 27 is enhancement of the gripping action against the cable strength member.

Figure 3B:
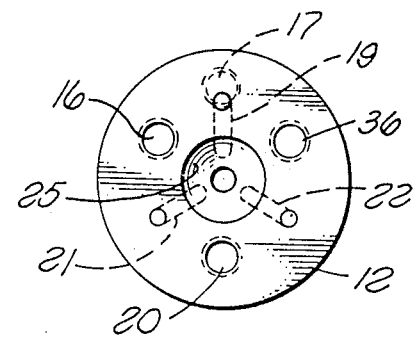

Referring now to FIG. 1, the assembled relative positions of the parts 11, 12 and 13 are illustrated, just one of the three assumed pressure cone bolts 15 being shown typically. From FIG. 1, the similarly identified parts are readily related to FIGS. 2, 3, and 4.

In FIG. 5, the typical fiber optic cable 31 illustrated comprises a steel cable strength member which is copper-clad (plated) and is on the order of 1 millimeter in diameter. Over this, a polyethylene sleeve 33 on the order of 3 millimeters in thickness is provided and outside that, three optical fibers, of which 34 is a typical one, are implaced at approximately 120° circumferential spacing. Finally, an outside polyethylene jacket 35 on the order of 3 millimeters in thickness covers the entire cable. The steel cable or strength member 32 will be seen in FIG. 5 to be implaced in the axial bore 27 of the pressure cone part 13 and is gripped therein in accordance with the ridges or threads in 27. Projecting through bore 27 is the copper-clad strength member 32, a lug 37 having been placed thereon for electrical connection to power repeater/amplifier components or the like within the housing with which the termination device of the invention is associated. Quite obviously from FIG. 5, the right side of the view of FIG. 5 is the repeater housing internal side, the left side where the cable 32 enters being the sea side.

Once assembled, the entire structure may be impregnated or filled with a tack, bubble and oxidation free solid, liquid or semliquid insulating filler or a type known to those skilled in this art to prevent any water or moisture penetration and assure higher electrical safety. Depending upon the prevailing differential expansion coefficient between the electrical filler and water under pressure, an equalizing membrane may be added so that the filler material will not be subjected to the full differential of pressure between the submarine environment on the one hand and a much lower pressure on the other hand. Seals may also be provided at the cable entry, insulating cup flange and matching parts of the termination structure if desired. The protrusion of the strength member at the right of the FIG. 5 permits electrical connection 37, and it will be realized that in view of the insulating cup 11, this strength member, which doubles as an electrical conductor is isolated electrically from the housing or other apparatus associated with the device.

The apparatus according to the invention may be associated with a connector, an end module, or an end line unit such as a submarine repeating housing, etc., in its described and illustrated configuration.

Parts 12 and 13 may typically be fabricated by machining processes of stainless steel, titanium or other environmentally suited metal or metallic alloy.

Modifications will suggest themselves to those skilled in this art, once the invention is understood. Matters of scale, materials including impregnating material and mechanical details and shapes are within the skill of the art. Accordingly, such modifications and variations would be expected to fall within the scope of the invention. The drawings and this description are to be regarded as typical and illustrative only.

What is claimed is:

1. Apparatus for terminating a cable having at least one optical fiber and a strength member therein, comprising:
   a compression block having an axial conical cavity therethrough and at least one optical fiber clearance passage passing through said block outside of but adjacent to said conical cavity;

a pressure cone having an axial bore therethrough, said cone having at least one axial slot through the wall formed by said bore and the conical outside surface of said pressure cone;

and means for securing said pressure cone into said compression block conical cavity and for exerting axial compression therebetween to cause said axial slot to tend to close therby exerting a radially inward gripping force against said strength member inserted into said axial cavity from the narrow end of said compression block axial cavity, said optical fiber passing substantially freely through said passage.

2. The invention according to claim 1 further defined in that said axial slots through said pressure cone wall are at least two in number and are uniformly spaced circumferentially to form tines which tend to deflect radially inward to grip said strength member in response to said axial compression between said pressure cone and said compression block.

3. Apparatus according to claim 2 in which said pressure cone axial bore contains internal generally circumferential ridges whereby said gripping force produces large resistance to axial tension forces applied to said strength member.

4. Apparatus according to claim 3 in which said ridges are formed as a thread.

5. Apparatus according to claim 3 in which said axial slots are four in number thereby forming four of said tines.

6. Apparatus according to claim 1 in which said pressure cone axial bore contains internal generally circumferential ridges whereby said gripping force produces large resistance to axial tension forces applied to said strength member.

7. Apparatus according to claim 1 in which said compression block and said conical cavity are of circular cross section, said pressure cone is a circular cone, and additional means are provided comprising an insulating cup having a generally axial cavity therein for receiving said compression block slip-fit into the open end of said cup, in which means are supplied for constraining rotation of said block within said cup, and in which means are provided for mounting said cup in a housing, said block and said pressure cone being thereby mechanically attached to said housing but electrically insulated therefrom.

* * * * *